US010859772B1

(12) United States Patent
Bradley et al.

(10) Patent No.: US 10,859,772 B1
(45) Date of Patent: Dec. 8, 2020

(54) ROUTING OF MULTICORE OPTICAL FIBERS IN DATA NETWORKS

(71) Applicant: OFS Fitel, LLC, Norcross, GA (US)

(72) Inventors: Kelvin B Bradley, Lawrenceville, GA (US); Eric J Leichter, Buford, GA (US); Gregory A Sandels, Buford, GA (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 16/578,914

(22) Filed: Sep. 23, 2019

(51) Int. Cl.
*G02B 6/38* (2006.01)
*G02B 6/44* (2006.01)
*G02B 6/46* (2006.01)

(52) U.S. Cl.
CPC ......... *G02B 6/3831* (2013.01); *G02B 6/3851* (2013.01); *G02B 6/447* (2013.01); *G02B 6/4472* (2013.01); *G02B 6/46* (2013.01)

(58) Field of Classification Search
CPC .............. G02B 6/02042; G02B 6/3831; G02B 6/3851; G02B 6/3882; G02B 6/3885; G02B 6/3887; G02B 6/3893; G02B 6/3897; G02B 6/4292; G02B 6/4432; G02B 6/4403; G02B 6/4246; G02B 6/4452; G02B 6/447; G02B 6/4472; G02B 6/46; H04B 10/40
USPC ...................................... 385/53–78
See application file for complete search history.

(56) References Cited

U.S. PATENT DOCUMENTS

2014/0219609 A1\* 8/2014 Nielson .................... G02B 6/46
385/54

\* cited by examiner

*Primary Examiner* — Michael P Mooney
(74) *Attorney, Agent, or Firm* — Law Office of Leo Zucker

(57) ABSTRACT

A method of connecting lengths of multicore optical fibers (MCFs) to one another. First and second lengths of a MCF whose cores are arranged in a certain pattern about the fiber axis to define pairs of cores are provided, and the cores of each pair of cores are disposed symmetrically with respect to a key plane that includes the axis of the fiber. Ends of the first and the second lengths of the MCF are arranged in axial alignment with one another, and the key plane at the end of the first length of the MCF is aligned with the key plane at the end of the second length of the MCF. Each defined pair of cores in the first length of the MCF is thereby positioned to mate with the same defined pair of cores in the second length of the MCF.

21 Claims, 5 Drawing Sheets

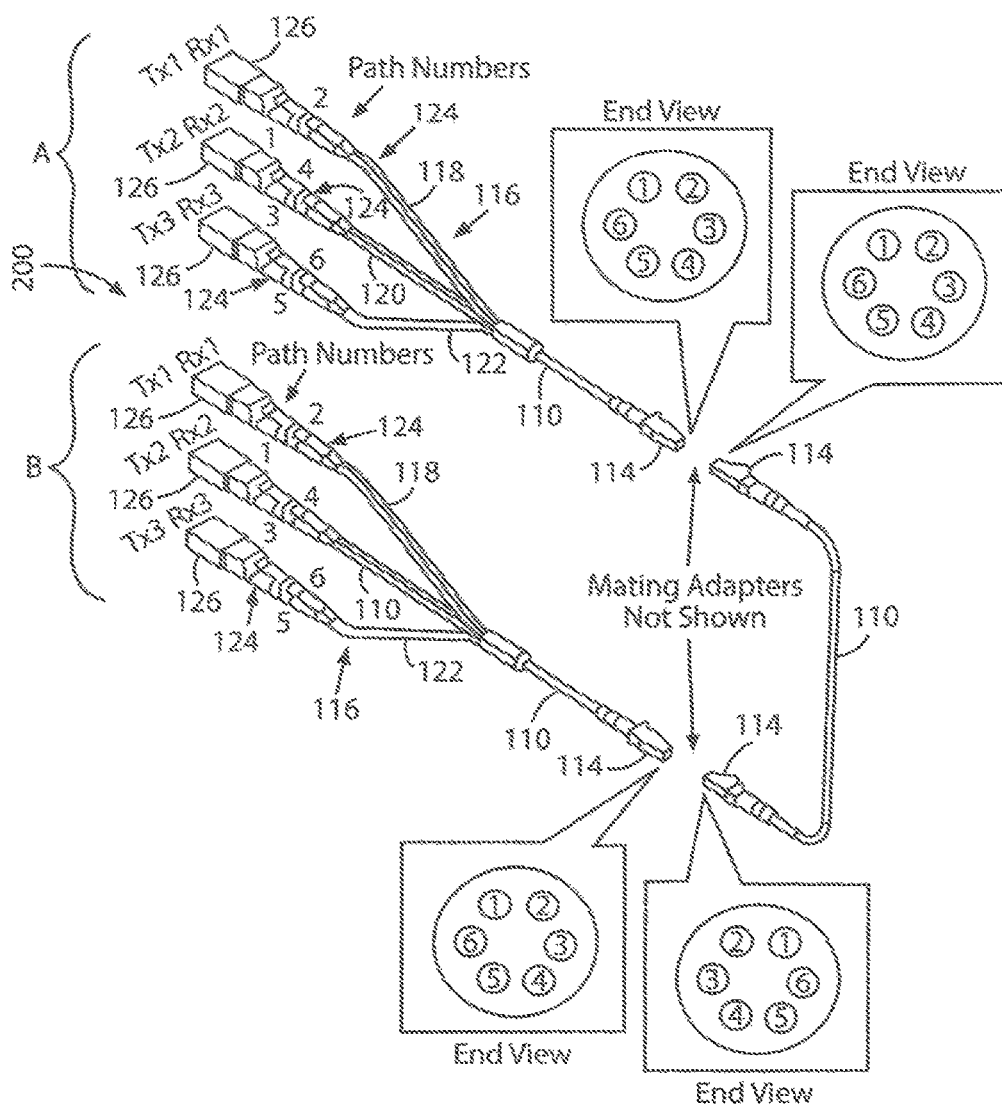
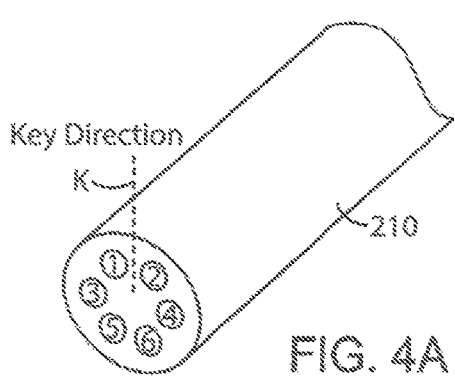
FIG. 3 (Prior Art)
FIG. 4A

ROUTING OF MULTICORE OPTICAL FIBERS IN DATA NETWORKS

BACKGROUND OF THE INVENTION

Field of the Invention

The present invention relates to the use and routing of multicore optical fibers (MCFs) in data networks.

Discussion of the Known Art

A traditional fiber optic cable contains one or more optical fibers each of which consists of a single core, a cladding layer surrounding the core, a protective outer layer or jacket, and optical connectors at opposite ends of the cable. Moreover, the positions at which the ends of individual fibers are exposed on a connector at one end of the cable can, if desired, be reorganized on an identical connector at the opposite end of the cable.

For example, the position at which the end of a first fiber is exposed on a multifiber connector at one end of a 12-fiber cable, can be changed on an identical connector at the opposite end of the cable so that the first fiber end is at the position occupied by any one of the second thru twelfth fiber ends on the connector at the one end of the cable. This flexibility ensures that light directed into a given fiber from a transmitting port at one end of the cable, can be routed correctly from the given fiber to a desired receiving port at the other end of the cable.

High capacity fiber optic networks and data centers that interface with traditional electronic devices and which operate under standardized transmission protocols such as, e.g., ATM, Fast and Gigabit Ethernet, and SONET/SDH, employ so-called small form factor pluggable (SFP) transceiver modules each of which has an optical transmitting (Tx) port and an optical receiving (Rx) port configured adjacent to one another on the module to form a combined or duplex optical Tx/Rx port. Physical dimensions and other features of the module, including its electrical connections and interfaces, are outlined in a Cooperation Agreement for Small Form Factor Pluggable Transceivers, originally dated Sep. 14, 2000, and entered into by parties to establish internationally compatible sources of SFP transceiver modules that support the above mentioned and other protocols. See, e.g., U.S. Pat. No. 6,830,383 (Dec. 14, 2004) which is incorporated by reference.

The Tx/Rx ports of a number of first transceiver modules located at, for example, a first equipment rack within a data center or central office are typically linked to corresponding ports of a number of second transceiver modules at a second equipment rack within the same or another data center or central office via traditional fiber optic cables. Because the cables contain single core fibers, two cable fibers are needed to link a given Tx/Rx port of the first modules to a corresponding Tx/Rx port of the second modules.

Fiber optic cables containing one or more multicore optical fibers (MCFs) are currently available. A single MCF contains two or more cores that are surrounded by and embedded within a common cladding over the length of the fiber. Different signals can therefore be transmitted simultaneously through different cores of a single MCF. For example, two cores within one MCF can link the Tx/Rx ports of two transceiver modules for full duplex optical data transmissions between the modules. See, e.g., U.S. Pat. No. 8,425,126 (Apr. 23, 2013) which is incorporated by reference.

FIGS. 1A and 1B show typical six- and eight-core MCFs 10, 12. As seen in the drawing, the cores of the fibers 10 and 12 are not aligned in a common plane but are organized in a circular pattern about the center axis of the fiber. In addition, because the positions of the cores in each fiber are fixed relative to one another within the common fiber cladding, the relative positions of the ends of the cores at opposite ends of the fiber cannot be reorganized or changed.

FIG. 2 illustrates a proposed fiber optical link between transceivers at two equipment racks A and B. Each rack has three transceivers, the Tx N/Rx N ports (N=1, 2, or 3) of which are to be linked with one another. Thus, a total of six separate routing paths are needed between the equipment racks as shown in the drawing. Namely, paths 1 and 2 only carry data transmitted between ports Tx 1/Rx 1 of first transceivers at the racks. Likewise, paths 3 and 4 only carry data transmitted between the ports Tx 2/Rx 2 of second transceivers at the racks, and paths 5 and 6 only carry data transmitted between the ports Tx 3/Rx 3 of third transceivers at the racks.

It will therefore be appreciated that a single multicore fiber which contains at least three pairs of cores, for example, the six-core MCF 10 in FIG. 1A, has the capacity to link the transceivers at the two equipment racks A and B as described above, provided suitable breakout arrangements (or fanouts) are used to transition the pairs of cores exposed at an end of each MCF 10 into corresponding pairs of single core fibers for connection to the proper Tx N/Rx N ports of the transceivers (see, e.g., U.S. Pat. No. 8,425,126). In addition, any connection points between two or more lengths of the MCF 10 must be effected so that the same pair of cores in each length of the fiber are connected to one another, as explained below.

Assume as shown in FIG. 2 that two lengths of the six-core MCF 10 in FIG. 1A are to be connected to one another through identical connectors 14 that are mated through a conventional adapter. In order to define the six routing paths needed to link the first, the second, and the third transceivers at the equipment racks with one another, each MCF 10 is transitioned at an end opposite their connectors 14 through a conventional fanout 16 into three pairs of single core fibers 18, 20, and 22. In fanout 16, the cores of fiber pair 18 are connected to core ##1 and 2 of the MCF 10, the cores of fiber pair 20 are connected to core ##3 and 4, and the cores of fiber pair 22 are connected to core ##5 and 6. Also assume that the fiber pairs 18, 20, 22 are connected via conventional, e.g., duplex LC connectors 24, to corresponding ports Tx N/Rx N of transceiver modules 26, and that the following routing paths are assigned by number to the ports as follows.

| Port | Routing Path Nos. |
| --- | --- |
| Tx 1/Rx 1 | 1, 2 |
| Tx 2/Rx 2 | 3, 4 |
| Tx 3/Rx 3 | 5, 6 |

To link a given transceiver at one of the equipment racks correctly with a corresponding transceiver at the other rack, it will be understood that signals transmitted from and received at a given Tx N/Rx N port at either rack must be routed over the paths assigned to the port, or else transmitted data will be lost. A problem arises, however, when one attempts to insert the cores in the two MCFs 10 as numbered in FIGS. 1A and 2, into the same numbered routing paths by connecting the fibers 10 to one another through the connectors 14.

Specifically, when the two MCFs 10 in FIG. 2 are connected through the connectors 14 so that the ends of the six numbered cores in each fiber are connected to one another, then the end of core #1 in the fiber 10 at the left is connected to the end of core #2 in the fiber 10 at the right; the end of core #6 in the fiber 10 at the left is connected to the end of core #3 in the fiber at the right, and the end of core #5 in the fiber at the left is connected to the end of core #4 in the fiber at the right. That is, the cores in the first fiber 10 are not consistently mated to the cores that define the matching routing paths in the second fiber 10. As a result, and as shown in the Routing Scheme table in FIG. 2, data transmitted by transceiver 2 at one equipment rack will be routed incorrectly to transceiver 3 at the other rack, and data transmitted by transceiver 3 at one rack will be routed incorrectly to transceiver 2 at the other rack.

FIG. 3 illustrates two connection points between three lengths of six-core MCFs 110 with fanouts 116. Components in FIG. 3 that are the same as those in FIG. 2 have the same reference numerals increased by 100.

Again, and as shown in the Routing Scheme table in FIG. 3, data transmitted by transceiver 2 at one equipment rack will be routed incorrectly to transceiver 3 at the other rack, and vice versa. Also, data transmitted by transceiver 3 at one rack will be routed incorrectly to transceiver 2 at the other rack, and vice versa.

Multifiber or so-called MPO connectors are known for connecting fiber optic cables that contain a number of single core fibers with one another, such that a given pair of fibers in one cable can be connected with correct polarity to a corresponding pair of fibers in another cable. See, e.g., U.S. Pat. No. 7,237,966 (Jul. 3, 2007), U.S. Pat. No. 7,147,383 (Dec. 12, 2006), and U.S. Pat. No. 6,869,227 (Mar. 22, 2005). The patents are not concerned with maintaining a correct polarity or continuity among specified pairs of cores when two multicore fibers are connected to one another, however.

In view of the above, there is a need for a routing scheme that allows the cores within two or more multicore fibers to be connected to one another so that the fiber cores form continuous routing paths for carrying data transmissions between ports at opposite ends of the connected fibers. There is also a need for a scheme that enables simultaneous or duplex data transmissions to be carried over a continuous pair of cores in two or more multicore fibers when connected to one another.

SUMMARY OF THE INVENTION

According to the invention, a method of connecting lengths of multicore optical fibers to one another includes providing a first length of a multicore optical fiber (MCF) having a number of cores arranged in a certain pattern about a central axis of the fiber to define a number of pairs of cores, wherein the cores of each pair are disposed symmetrically with respect to a key plane that includes the axis of the fiber. A second length of the MCF is provided, and ends of the first and the second lengths of the MCF are arranged in axial alignment with one another. The key plane at the end of the first length of the MCF is aligned with the key plane at the end of the second length of the MCF, thereby placing each defined pair of cores in the first length of the MCF in position to mate with the same defined pair of cores in the second length of the MCF.

For a better understanding of the invention, reference is made to the following description taken in conjunction with the accompanying drawing and the appended claims.

BRIEF DESCRIPTION OF THE DRAWING FIGURES

In the drawing:

FIG. 3 illustrates two connection points between three six-core MCFs with fanouts;

FIG. 4A is an end view of a six-core MCF, wherein the ends of the cores in the fiber are keyed and numbered according to the invention;

DETAILED DESCRIPTION OF THE INVENTION

The present invention is directed to a routing arrangement or scheme that enables a defined pair of cores in two or more multicore optical fibers (MCFs) to form a corresponding pair of routing paths when two or more fibers are connected to one another, so that simultaneous or duplex transmissions can be carried over the routing paths between data ports at opposite ends of the connected fibers without transmission loss.

Figure 1A:
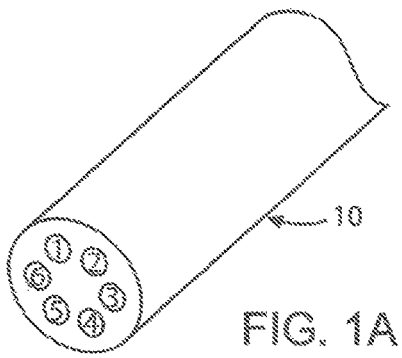
FIG. 1A is an end view of a six-core multicore fiber (MCF)
Figure 1B:
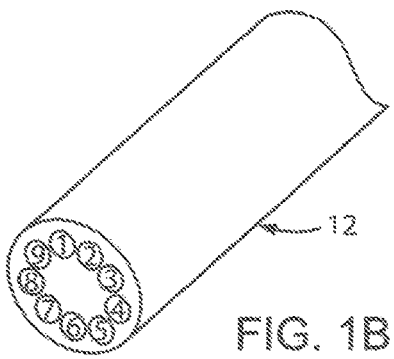
FIG. 1B is an end view of an eight-core MCF.
Figure 2:
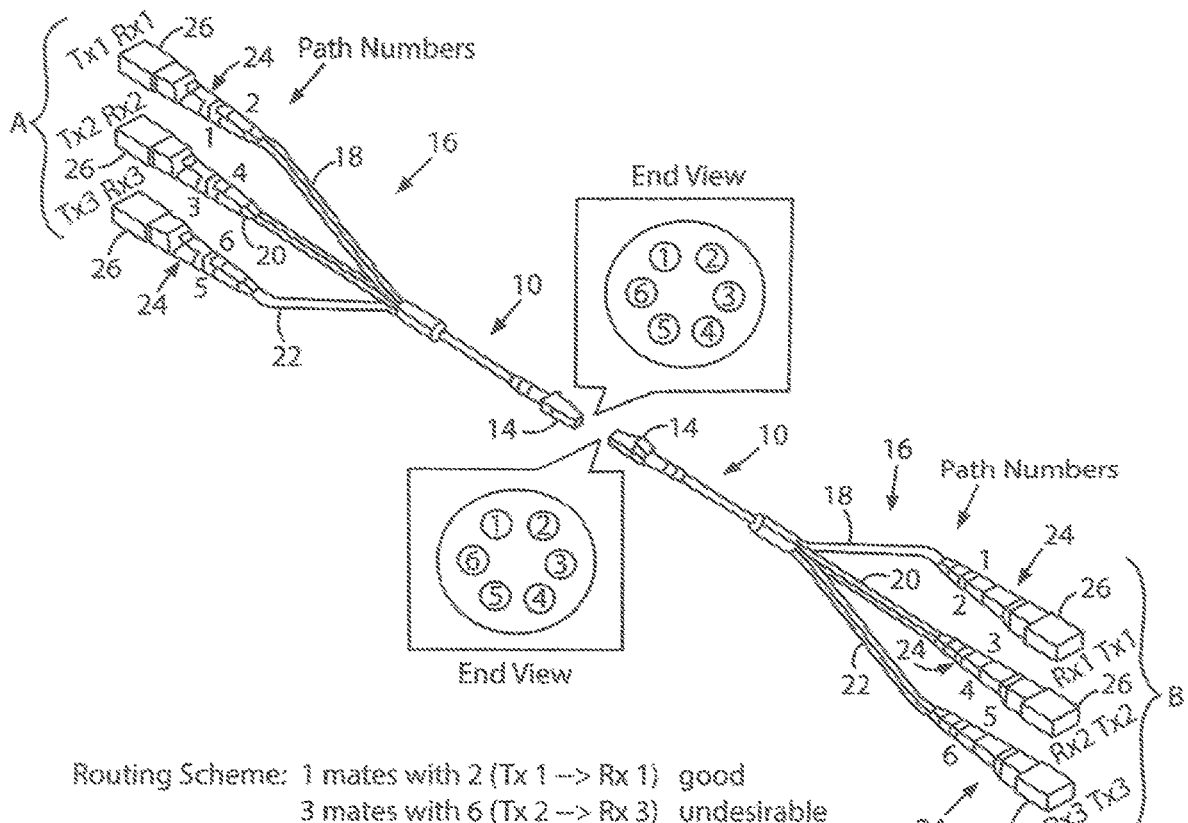
FIG. 2 illustrates one connection point between two six-core MCFs with fanouts.
Figure 4B:
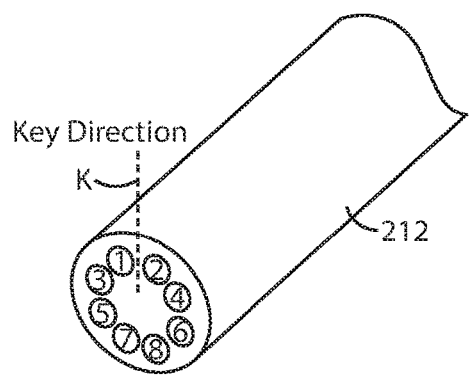
FIG. 4B is an end view of an eight-core MCF, wherein the ends of the cores in the fiber are keyed and numbered according to the invention.

FIGS. 4A and 4B are end views of a six-core MCF 210 and an eight-core MCF 212, wherein the cores of the fibers 210, 212 are organized and keyed according to the invention. Specifically, when the ends of the cores in two or more of, e.g., the MCFs 210 in FIG. 4A are connected to one another through, for example, commercially available simplex MCF connectors 214 and an available simplex adapter as in FIGS. 5 and 6, the cores in each fiber 210 are oriented and keyed on the connectors 214 so that breakouts 216 at opposite ends of the connection point are able to (a) route a light signal transmitted from one of a number of ports Tx N/Rx N at a first end of the connected fibers, to a desired one of a number of ports Tx N/Rx N at a second end of the fibers, and (b) route a light signal transmitted from one of the number of ports at the second end of the connected fibers, to a desired one of the number of ports at the first end of the fibers. This is a unique organization of breakout fibers and cores that does not follow a traditional order of duplex or multifiber cable connectors.

As shown in FIGS. 4A and 4B, a vertical key plane K is defined through an endface of either fiber 210 or 212, so that the key plane extends midway between the two top cores as viewed in the drawing, and includes the center axis of the fiber such that the ends of the fiber cores are symmetrically disposed at either side of the key plane. In addition, the cores are grouped into defined pairs wherein each pair of cores is at the same horizontal level with respect to the vertical key plane.

Currently, many MCFs are provided with markers that are embedded in the fiber cladding along the length of the fiber, and which can be viewed easily at an end of the fiber while being terminated with a connector. The markers are created by inserting a glass rod with a different index of refraction into the fiber preform prior to drawing the perform to produce the MCF. While the fiber cores are not necessarily located symmetrically relative to the marker, such markers could be used to assist in positioning the cores in a desired rotational alignment relative to a physical key that is provided on the connector housing to correspond with the key plane. This is one way the alignment can be performed, due to the difference in scale between the fiber endface and the connector housing (i.e., microns vs. mm).

Since the fiber endface has to be greatly magnified using a microscope, it is virtually impossible to focus on the cores and the marker while simultaneously keeping the connector housing in the field of view. Therefore, the connector housing is preferably held at a fixed position with the physical key (i.e., the key plane) aligned at the 12 o'clock position using a precision fixture. Then, while viewing the fiber cores, the marker is used to help identify and distinguish the cores. The connector ferrule holder into which the fiber is bonded inside the connector body, is then rotated until the fiber cores are aligned symmetrically to either side of the physical key on the connector housing.

Furthermore, in accordance with the invention, the fiber cores are numbered starting, for example, with core #1 at the top of the fiber endface and to the left of the key plane, and core #2 at the top of the fiber endface and to the right of the key plane. The next horizontally aligned pair of cores below cores ##1 and 2 and at the left and the right sides of the key plane are assigned ##3 and 4 respectively, and the next horizontally aligned pair of cores below cores ##3 and 4 and at the left and the right sides of the key plane are assigned ##5 and 6 respectively. That is, the cores are numbered at each horizontal level starting from the top in FIGS. 4A and 4B, using successive odd numbers at the left of the key plane and even numbers at the right.

Figure 5:
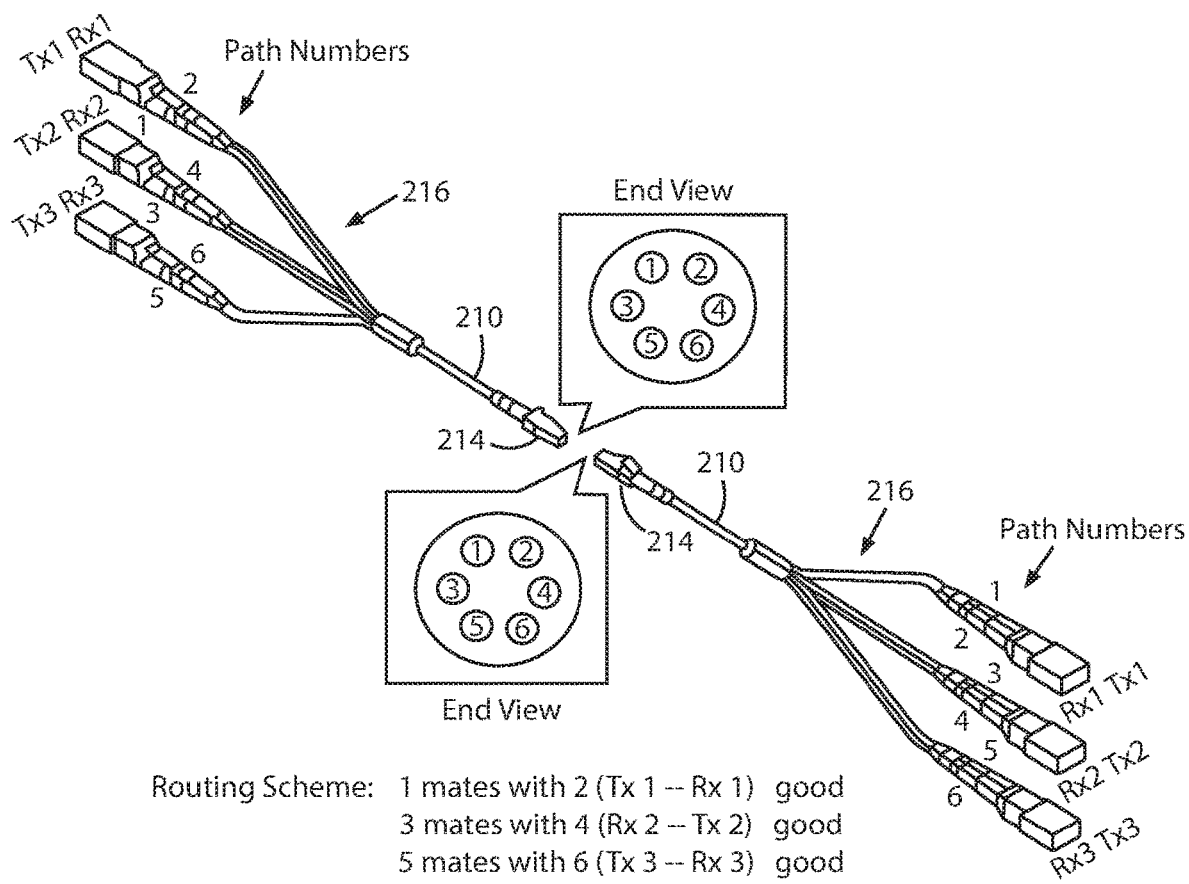
FIG. 5 illustrates one connection point between two of the six-core MCFs in FIG. 4A, with fanouts.
Figure 6:
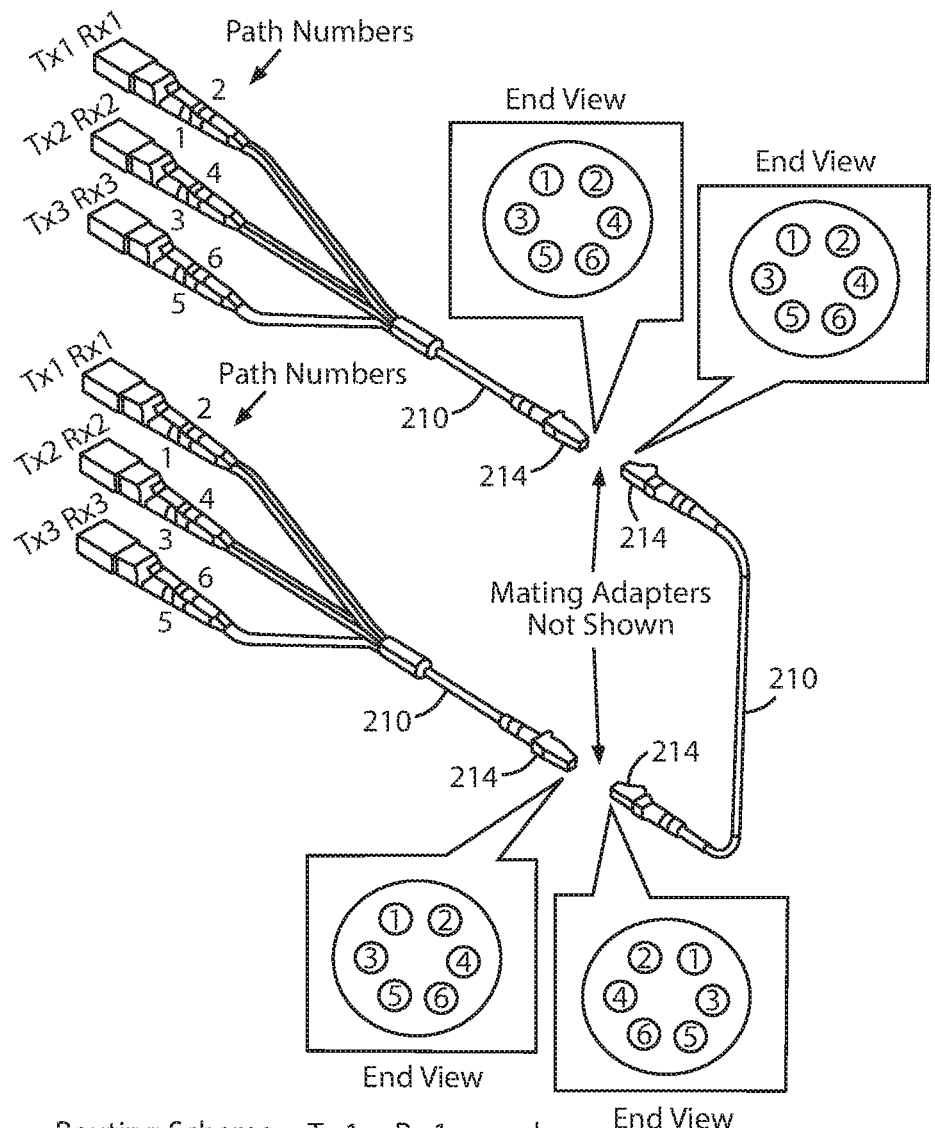
FIG. 6 illustrates two connection points between three of the six-core MCFs in FIG. 4A, with fanouts.

FIGS. 5 and 6 and the Routing Scheme tables therein illustrate how the three pairs of single core fibers in the breakouts 216 can connect with corresponding pairs of cores in the connected MCFs 210, so as to support duplex transmissions between multiple transceiver ports at both ends of the connected fibers. In particular, the breakouts 216 are configured so that fiber cores #1 and #2 at the end face of each connector 214 are transitioned into individual single core fibers also labeled as #1 and #2 in FIGS. 5 and 6. This labeling or numbering method does not follow existing color coding or other traditional methods of ordering fibers.

Note that the single core fibers in the breakouts 216 are identified, arranged, and paired in accordance with the desired routing scheme. Basically, once the multicore fibers 210 are oriented relative to the key planes through the connectors, the single-core fibers of the breakouts 216 also have to be identified and arranged correctly.

Figure 7A:
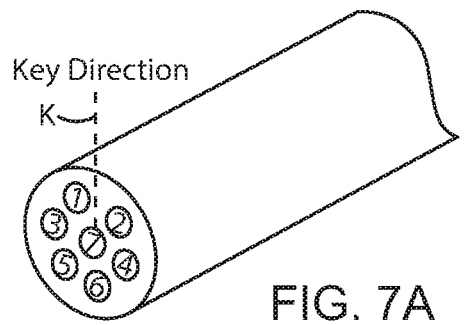
FIG. 7A is an end view of a seven-core MCF, wherein the ends of the cores in the fiber are keyed and numbered according to the invention.
Figure 7B:
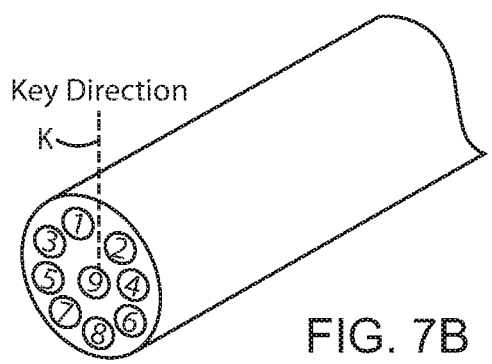
FIG. 7B is an end view of a nine-core MCF, wherein the ends of the cores in the fiber are keyed and numbered according to the invention.

The routing scheme disclosed herein can be applied to multicore optical fibers containing four, six, eight, ten, or more cores that are embedded in the fiber cladding in a circular array about the geometrical center axis of the fiber. The electronic devices associated with the transceivers may also transmit and receive light signals via a center core of a MCF, therefore allowing the use of a MCF having an odd number of cores. In such a case, the center core can be labeled as a last core to be transitioned via the breakouts 216. For example, FIG. 7A shows a seven-core MCF, and FIG. 7B shows a nine-core MCF, wherein each fiber has a center core which is labeled #7 or #9, respectively.

In a variation of the core numbering method disclosed above, rather than define a fixed key plane, the ferrule of each connector 214 and the multicore fiber within may be rotated into a correct position in the field based on tuning for optimum light transmission. See, e.g., U.S. Pat. No. 8,801, 301 (Aug. 12, 2014) which is incorporated by reference.

Figure 9A:
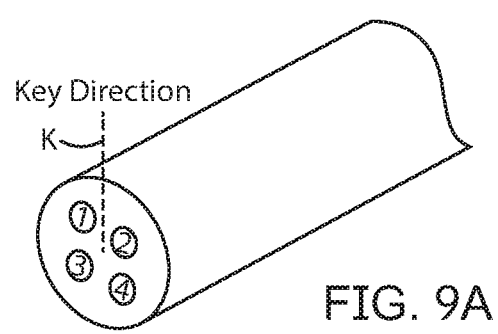
FIG. 9A is an end view of the four-core MCF in FIG. 8A, wherein the ends of the cores are keyed and numbered according to the invention.
Figure 8A:
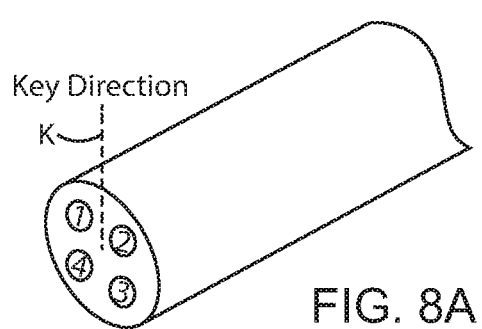
FIG. 8A is an end view of a four-core MCF wherein the ends of the cores are fixed in a square pattern.
Figure 9B:
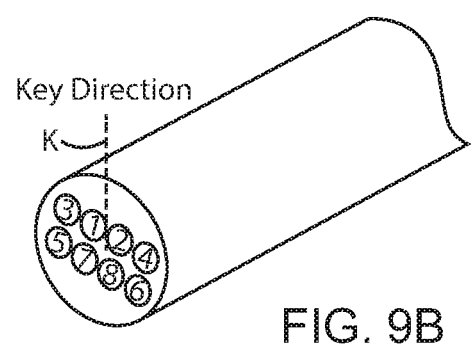
FIG. 9B is an end view of the eight-core MCF in FIG. 8B, wherein the ends of the cores are keyed and numbered according to the invention.
Figure 8B:
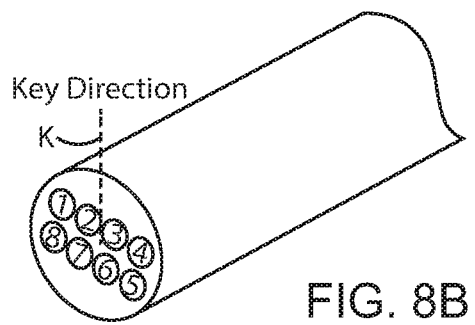
FIG. 8B is an end view of an eight-core MCF wherein the ends of the cores are fixed in a rectangular pattern.

FIGS. 8A and 8B show examples of multicore fibers having four or eight cores arranged in square or rectangular patterns that are divided symmetrically at either side of the key plane K, wherein the cores are numbered consecutively according to existing practice. As shown in FIGS. 9A and 9B, however, by numbering the cores at opposite sides of the key plane according to the invention, transmitted signals can be routed to the correct receiving ports.

As explained earlier, current optical patching and routing schemes do not provide a straightforward way to ensure that light signals transmitted from one transceiver via a multicore fiber will reach the correct receiving port of another transceiver. The inventive multicore fiber routing scheme disclosed herein will, however, provide consistent optimal connectivity between transmitting devices at one location and receiving devices at another location, and vice versa. Note further that while the optical links disclosed herein terminate at the transceivers 26 at each end, any given link may also be part of a cross-connect that connects to another fiber link, and that the transceivers 26 need not necessarily be plugged directly into a given link.

While the foregoing represents preferred embodiments of the present invention, it will be understood by persons skilled in the art that various changes, modifications, and additions can be made without departing from the spirit and scope of the invention, and that the invention includes all such changes, modifications, and additions that are within the scope of the following claims.

We claim:

1. A method of connecting lengths of multicore optical fibers to one another, comprising:
   providing a first length of a multicore optical fiber (MCF) having a number of cores arranged in a certain pattern about a central axis of the fiber to define a number of pairs of cores, wherein the cores of each pair are disposed symmetrically with respect to a key plane that includes the axis of the fiber;
   providing a second length of the MCF;
   arranging ends of the first and the second lengths of the MCF in axial alignment with respect to one another; and
   aligning the key plane at the end of the first length of the MCF with the key plane at the end of the second length of the MCF, thereby placing each defined pair of cores in the first length of the MCF in position to mate with the same defined pair of cores in the second length of the MCF.

2. The method of claim 1, including arranging the cores of the first and the second lengths of the MCF in a circular pattern about the central axes of the fibers.

3. The method of claim 1, including arranging the cores of the first and the second lengths of the MCF in a rectangular pattern about the central axes of the fibers.

4. The method of claim 1, including providing the first and the second lengths of the MCF with a central core that coincides with the axes of the lengths of the MCF.

5. The method of claim 1, including providing a breakout at an end of the connected first and second lengths of the MCF, wherein the breakout has a number of single core fibers each one of which is connected to a corresponding core at the end of the length of the MCF.

6. The method of claim 5, including arranging the single core fibers of the breakout in pairs wherein each pair of single core fibers is connected at one end to one of the defined pairs of cores at the end of the length of the MCF.

7. The method of claim 6, including connecting the other end of a given pair of the single core fibers to a Tx/Rx port of a transceiver.

8. The method of claim 1, including providing a connector adapter, and connecting each defined pair of cores in the first length of the MCF to the same defined pair of cores in the second length of the MCF by way of the adapter.

9. The method of claim 1, including providing one or more intermediate lengths of the MCF, connecting each defined pair of cores at one end of the intermediate lengths to the same defined pair of cores in the first length of the MCF, and connecting each defined pair of cores at the opposite end of the intermediate lengths to the same defined pair of cores in the second length of the MCF.

10. The method of claim 7, including linking the Tx/Rx ports of a number of pairs of transceivers to one another for simultaneous or full duplex communication between each pair of transceivers through connected lengths of the MCF, and through breakouts at opposite ends of the connected lengths of the MCF.

11. The method of claim 1, including providing the MCF with a marker that is embedded in the fiber cladding along the length of the fiber, and using the marker to assist with identifying each of the defined core pairs.

12. The method of claim 11, including terminating the ends of the lengths of the MCF with a connector, and providing a physical key that corresponds to the key plane on the housing of the connector.

13. A fiber optic link between a number of pairs of data transceivers, wherein each transceiver of a given pair has a Tx/Rx port for transmitting data to, and for receiving data from, the Tx/Rx port on the other transceiver of the given pair, comprising:

two or more lengths of a multicore optical fiber (MCF) having a number of cores arranged in a certain pattern about a central axis of the fiber to define a number of pairs of cores, wherein the cores of each pair are disposed symmetrically with respect to a key plane that includes the axis of the fiber;

successive lengths of the MCF are connected to one another so that the ends of the lengths of the MCF are in axial alignment with respect to one another; and the key plane at the end of a first successive length of the MCF is aligned with the key plane at the end of a second successive length of the MCF, thereby placing each defined pair of cores in the first successive length of the MCF in position to mate with the same defined pair of cores in the second successive length of the MCF.

14. The fiber optic link according to claim 13, wherein the cores of the lengths of the MCF are arranged in a circular pattern about the central axes of the fibers.

15. The fiber optic link according to claim 13, wherein the cores of the lengths of the MCF are arranged in a rectangular pattern about the central axes of the fibers.

16. The fiber optic link according to claim 13, wherein the lengths of the MCF have a central core that coincides with the axes of the lengths of the MCF.

17. The fiber optic link according to claim 13, including a breakout at an end of the successive lengths of the MCF, wherein the breakout includes a number of single core fibers each one of which is connected to a corresponding core at the end of the lengths of the MCF.

18. The fiber optic link according to claim 17, wherein the single core fibers of the breakout are arranged in pairs, and each pair of single core fibers is connected at one end to one of the defined pairs of cores at the end of the lengths of the MCF.

19. The fiber optic link according to claim 18, wherein the other end of a given pair of the single core fibers is connected to a corresponding Tx/Rx port of a data transceiver.

20. The fiber optic link according to claim 13, wherein each length of the MCF has a marker embedded in the fiber cladding along the length of the fiber, for assisting to identify each of the defined core pairs.

21. The fiber optic link according to claim 13, wherein the successive lengths of the MCF are connected to one another via connectors and a connector adapter, and each connector has a physical key on a housing of the connector that corresponds to the key plane that includes the axis of the fiber.

* * * * *